US007756923B2

(12) United States Patent
Caspi et al.

(10) Patent No.: US 7,756,923 B2
(45) Date of Patent: Jul. 13, 2010

(54) SYSTEM AND METHOD FOR INTELLIGENT MULTIMEDIA CONFERENCE COLLABORATION SUMMARIZATION

(75) Inventors: Rami Caspi, Sunnyvale, CA (US); William J. Beyda, Cupertino, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 436 days.

(21) Appl. No.: 10/316,279

(22) Filed: Dec. 11, 2002

(65) Prior Publication Data

US 2004/0246331 A1 Dec. 9, 2004

(51) Int. Cl.
*G06F 15/16* (2006.01)
(52) U.S. Cl. ........................ 709/204; 709/228; 709/231; 348/14.08; 379/88; 379/93; 370/262; 370/252; 715/733
(58) Field of Classification Search ................. 709/204, 709/228, 231; 348/14.08, 14.06; 379/88, 379/93, 88.93
See application file for complete search history.

(56) References Cited

U.S. PATENT DOCUMENTS

| | | | |
|---|---|---|---|
| 5,422,937 A | 6/1995 | Ferrara | |
| 5,526,407 A * | 6/1996 | Russell et al. | 379/88.01 |
| 5,533,110 A | 7/1996 | Pinard et al. | |
| 5,572,728 A * | 11/1996 | Tada et al. | 707/200 |
| 5,710,591 A * | 1/1998 | Bruno et al. | 348/14.09 |
| 5,987,376 A | 11/1999 | Olson et al. | |
| 6,167,395 A | 12/2000 | Beck et al. | |
| 6,252,952 B1 | 6/2001 | Kung et al. | |
| 6,346,952 B1 | 2/2002 | Shtivelman | |
| 6,377,995 B2 * | 4/2002 | Agraharam et al. | 709/231 |
| 6,389,124 B1 | 5/2002 | Schnarel et al. | |
| 6,393,460 B1 * | 5/2002 | Gruen et al. | 709/204 |
| 6,535,238 B1 * | 3/2003 | Kressin | 348/14.01 |
| 6,560,222 B1 | 5/2003 | Pounds et al. | |
| 6,658,095 B1 | 12/2003 | Yoakum et al. | |
| 6,757,722 B2 | 6/2004 | Lönnfors et al. | |
| 6,804,659 B1 * | 10/2004 | Graham et al. | 705/14 |
| 6,970,547 B2 | 11/2005 | Andrews et al. | |
| 7,185,054 B1 * | 2/2007 | Ludwig et al. | 709/204 |
| 2003/0014488 A1 * | 1/2003 | Dalal et al. | 709/204 |
| 2003/0125954 A1 * | 7/2003 | Bradley et al. | 704/270 |
| 2004/0059781 A1 | 3/2004 | Yoakum et al. | |
| 2004/0062383 A1 | 4/2004 | Sylvain | |
| 2004/0114541 A1 | 6/2004 | Caspi et al. | |
| 2004/0114746 A1 * | 6/2004 | Caspi et al. | 379/202.01 |
| 2004/0122901 A1 | 6/2004 | Sylvain | |
| 2004/0125941 A1 | 7/2004 | Yoakum | |
| 2004/0246331 A1 | 12/2004 | Caspi et al. | |
| 2004/0249884 A1 | 12/2004 | Caspi et al. | |
| 2005/0028194 A1 * | 2/2005 | Elenbaas et al. | 725/32 |
| 2007/0005804 A1 * | 1/2007 | Rideout | 709/246 |

\* cited by examiner

*Primary Examiner*—Saleh Najjar
*Assistant Examiner*—Thuong (Tina) T Nguyen

(57) ABSTRACT

A telecommunications system includes a network (102) and a multimedia server (104) operably coupled to the network. The multimedia server (104) is adapted to manage a multimedia conference and includes a memory (103) for storing selectable portions of the multimedia conference. The system further includes one or more client devices (122) operably coupled to the network and adapted to set recording cues for choosing portions of said multimedia conference for playback. The multimedia server or clients may include a voice recognition system (114) for transcribing audio portions of the conference. The voice recognition system may further be used to detect instances of the recording cues.

17 Claims, 10 Drawing Sheets

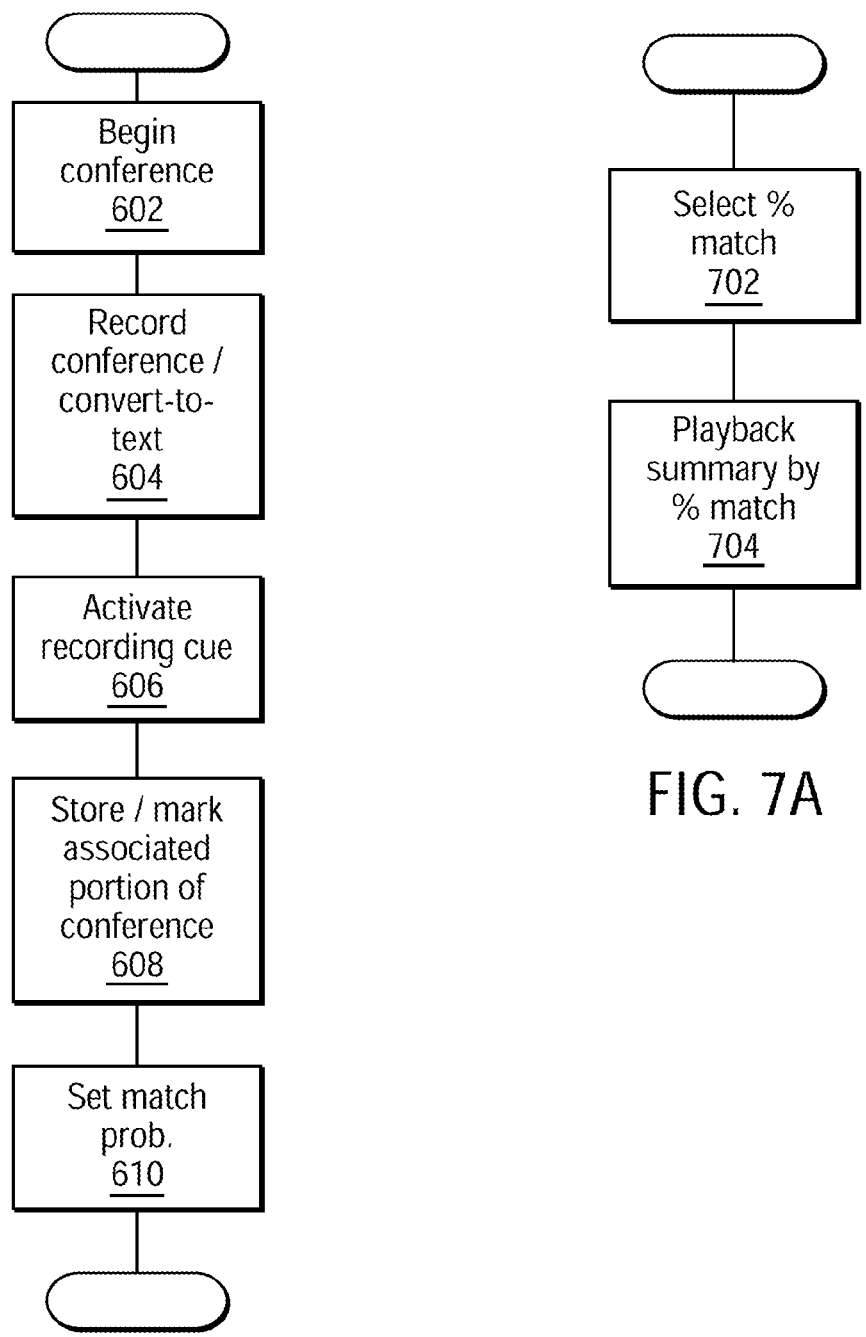

SYSTEM AND METHOD FOR INTELLIGENT MULTIMEDIA CONFERENCE COLLABORATION SUMMARIZATION

FIELD OF THE INVENTION

The present invention relates to telecommunications systems and, in particular, to an improved system and method for messaging collaboration summarization.

BACKGROUND OF THE INVENTION

The development of various voice over IP protocols such as the H.323 Recommendation and the Session Initiation Protocol (SIP) has led to increased interest in multimedia conferencing. In such conferencing, typically, a more or less central server manages the conference and maintains the various communications paths. Parties to the conference are able to communicate via voice and/or video through the server.

Instant messaging can provide an added dimension to multimedia conferences. In addition to allowing text chatting, instant messaging systems such as Microsoft® Windows® Messenger can allow for transfer of files, document sharing and collaboration, collaborative whiteboarding, and even voice and video.

As can be appreciated, a complete multimedia conference can involve multiple voice and video streams, the transfer of many files, and much marking-up of documents and whiteboarding. On occasion, an individual who is not a party to all or part of the conference may nevertheless find it necessary to review what was said. While a messaging server or individual clients may be able to record or store an entirety of such a conference, the reviewing party may not wish to replay the entire meeting, including all the irrelevant comments and dead ends typical in any multiparty collaboration.

As such, there is a need for a system and method for easily reviewing a multimedia conference. There is a further need for a system and method for accessing particular portions of a multimedia conference upon review.

SUMMARY OF THE INVENTION

These and other drawbacks in the prior art are overcome in large part by a system and method according to embodiments of the present invention.

A telecommunications system according to an embodiment of the present invention includes a network and a multimedia server operably coupled to the network. The multimedia server is adapted to manage a multimedia conference and includes a memory for storing selectable portions of the multimedia conference. The system further includes one or more client devices operably coupled to the network and adapted to set recording cues for choosing portions of said multimedia conference for playback. The multimedia server or clients may include a voice recognition system for transcribing audio portions of the conference. The voice recognition system may further be used to detect instances of the recording cues.

A method according to an embodiment of the present invention includes storing a plurality of recording cues adapted for marking a predetermined time period around which a portion of a multimedia conference is to be recorded; and capturing sequentially portions of the multimedia conference responsive to execution of the recording cues. The recording cues may be audio cues or may be whiteboard or document identifiers.

A telecommunications server according to an embodiment of the present invention is adapted to store or record a multimedia conference. In addition, the server may store a plurality of predetermined recording cues, settable by a user. The recording cues may include voice recording cues, recognizable by a voice recognition unit, or may include text or whiteboard identification recording cues. When the cues are identified, a predetermined amount of the conference is tagged or stored for summary play later. In addition, a percentage match or relevance probability when recording cues are identified may be assigned, such that the summary may be played back later based on relevance or the likelihood of a match.

A better understanding of these and other specific embodiments of the invention is obtained when the following detailed description is considered in conjunction with the following drawings.

BRIEF DESCRIPTION OF THE DRAWINGS

FIG. 6A is a flowchart illustrating operation of an embodiment of the present invention;

FIG. 7A is a flowchart illustrating operation of an embodiment of the present invention;

DETAILED DESCRIPTION OF EMBODIMENTS OF THE INVENTION

Figure 1:
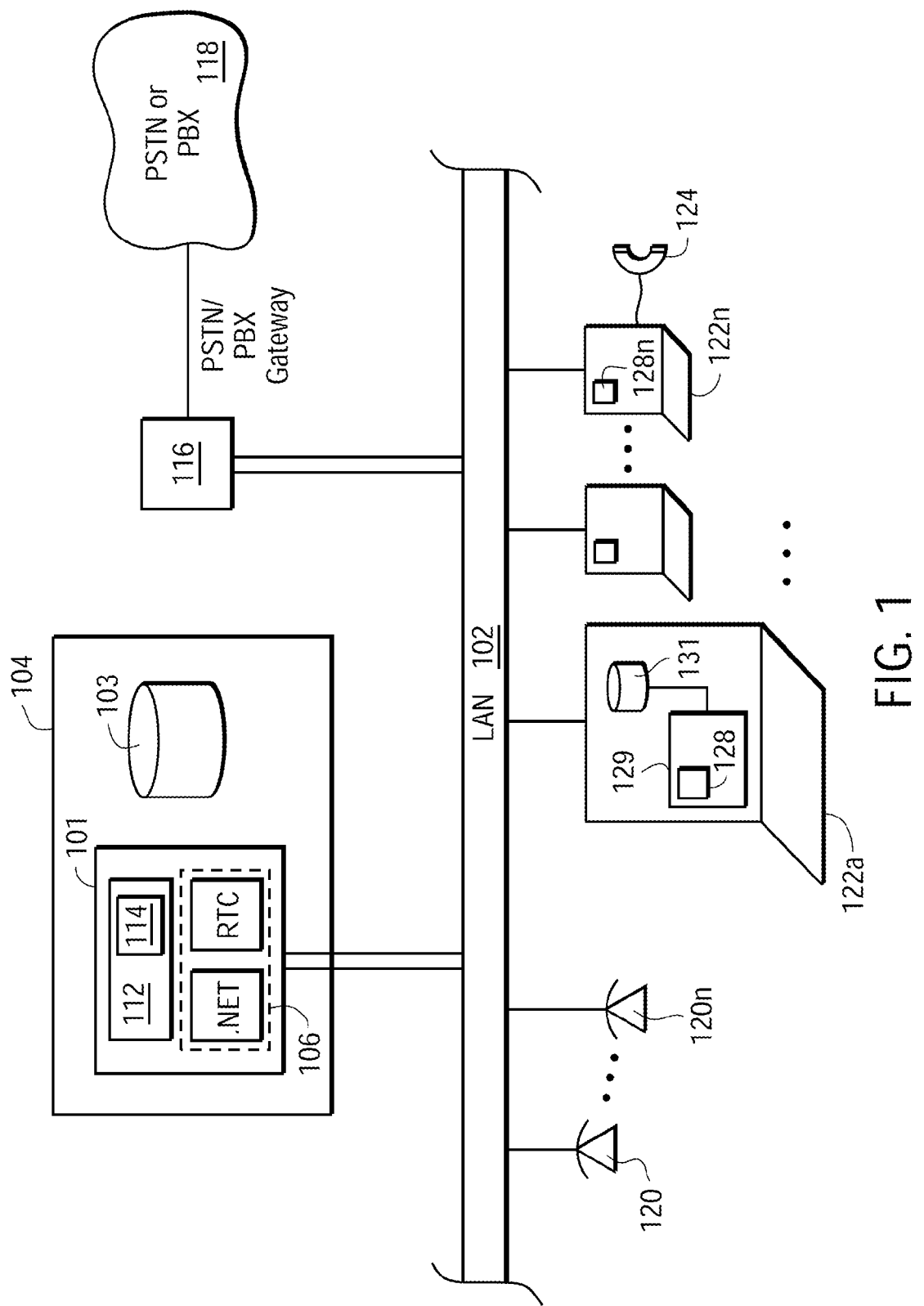
FIG. 1 is a diagram of a telecommunication system according to an embodiment of the present invention.

Turning now to the drawings and, with particular attention to FIG. 1, a diagram of an exemplary telecommunications system 100 according to an embodiment of the present invention is shown. As shown, the telecommunications system 100 includes a local area network (LAN) 102. The LAN 102 may be implemented using a TCP/IP network and may implement voice or multimedia over IP using, for example, the Session Initiation Protocol (SIP). Operably coupled to the local area network 102 is a server 104. The server 104 may include one or more controllers 101, which may be embodied as one or more microprocessors, and memory 103 for storing application programs and data. The controller 101 implements an instant messaging system 106. The instant messaging system may be embodied as Microsoft® Windows® Messenger or other instant messaging system. Thus, according to certain embodiments of the present invention, the instant messaging system 106 implements the Microsoft®.Net™ environment 108 and Real Time Communications protocol (RTC) 110.

In addition, according to embodiments of the present invention, a collaboration system 114 may be provided, which may be part of an interactive suite of applications 112, run by controller 101, as will be described in greater detail below.

Also coupled to the LAN 102 is a gateway 116 which may be implemented as a gateway to a private branch exchange (PBX), the public switched telephone network (PSTN) 118, or any of a variety of other networks, such as a wireless or cellular network. In addition, one or more LAN telephones 120a-120n and one or more computers 122a-122n may be operably coupled to the LAN 102.

The computers 122a-122n may be personal computers implementing the Windows® XP operating system and thus, Windows® Messenger. In addition, the computers 122a-122n may include telephony and other multimedia messaging capability using, for example, peripheral cameras, microphones and speakers (not shown) or peripheral telephony handsets 124, such as the Optipoint handset, available from Siemens Corporation. In other embodiments, one or more of the computers may be implemented as wireless telephones, digital telephones, or personal digital assistants (PDAs). Thus, the figures are exemplary only. As shown with reference to computer 122a, the computers may include one or more controllers 129, such as Pentium®-type microprocessors, and storage 131 for applications and other programs.

Finally, the computers 122a-122n may implement Interaction Services 128a-128n according to embodiments of the present invention. As will be described in greater detail below, the Interaction Services 128a-128n allow for interworking of phone, buddy list, instant messaging, presence, collaboration, calendar and other applications. In addition, according to embodiments of the present invention, the Interaction Services 128 allow access to the collaboration summarization module 114 of the server 104 and thus permit the user to access and manipulate conference summaries.

Figure 2:
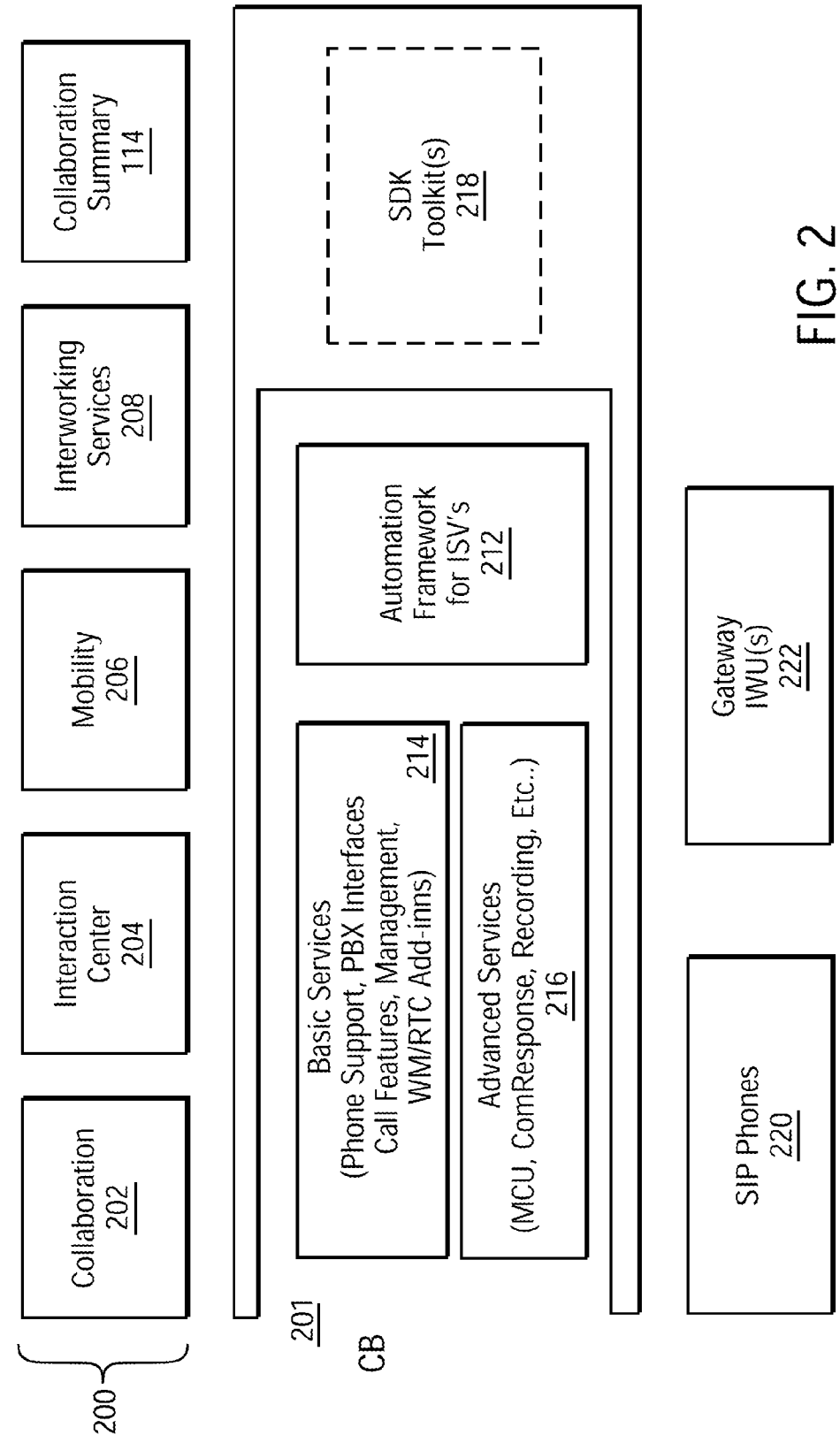
FIG. 2 is a diagram illustrating a telecommunications collaboration system according to an embodiment of the present invention.

Turning now to FIG. 2, a functional model diagram illustrating collaboration system 114 is shown. More particularly, FIG. 2 is a logical diagram illustrating a particular embodiment of a collaboration server 104. The server 104 includes a plurality of application modules 200 and a communication broker module 201. One or more of the application modules and communication broker module 201 may include an inference engine, i.e., a rules based artificial intelligence engine for implementing functions according to the present invention, as will be described in greater detail below. In addition, the server 104 provides interfaces, such as APIs (application programming interfaces) to SIP phones 220 and gateways/interworking units 222.

According to the embodiment illustrated, the broker module 201 includes a basic services module 214, an advanced services module 216, an automation module 212, and a toolkit module 218.

The basic services module 214 functions to implement, for example, phone support, PBX interfaces, call features and management, as well as Windows® Messaging and RTC add-ins, when necessary. The phone support features allow maintenance of and access to buddy lists and provide presence status.

The advanced services module 216 implements function such as presence, multipoint control unit (MCU), recording, and the like. MCU functions are used for voice conferencing and support ad hoc and dynamic conference creation from a buddy list following the SIP conferencing model for ad hoc conferences. In certain embodiments, support for G.711 and G.723.1 codecs is provided. Further, in certain embodiments, the MCU can distribute media processing over multiple servers using the MEGACO protocol.

Presence features provide device context for both SIP registered devices and user-defined non-SIP devices. Various user contexts, such as In Meeting, On Vacation, In the Office, etc., can be provided for. In addition, voice, e-mail and instant messaging availability may be provided across the user's devices. The presence feature enables real time call control using presence information, e.g., to choose a destination based on the presence of a user's devices. In addition, various components have a central repository for presence information and for changing and querying presence information. In addition, the presence module provides a user interface for presenting the user with presence information.

In addition, the broker module 201 may include the ComResponse platform, available from Siemens Information and Communication Networks, Inc. ComResponse features include speech recognition, speech-to-text, and text-to-speech, and allow for creation of scripts for applications. The speech recognition and speech-to-text features may be used by the collaboration summarization unit 114, as will be discussed in greater detail below.

In addition, real time call control is provided by a SIP API 220 associated with the basic services module 214. That is, calls can be intercepted in progress and real time actions performed on them, including directing those calls to alternate destinations based on rules and or other stimuli. The SIP API 220 also provides call progress monitoring capabilities and for reporting status of such calls to interested applications. The SIP API 220 also provides for call control from the user interface.

According to the embodiment illustrated, the application modules include a collaboration module 202, an interaction center module 204, a mobility module 206, an interworking services module 208, and a collaboration summarization module 114.

The collaboration module 202 allows for creation, modification or deletion of a collaboration session for a group of users. The collaboration module 202 may further allow for invoking a voice conference from any client. In addition, the collaboration module 202 can launch a multi-media conferencing package, such as the WebEx package. It is noted that the multi-media conferencing can be handled by other products.

The interaction center 204 provides a telephony interface for both subscribers and guests. Subscriber access functions include calendar access and voicemail and e-mail access. The calendar access allows the subscriber to accept, decline, or modify appointments, as well as block out particular times. The voicemail and e-mail access allows the subscriber to access and sort messages.

Similarly, the guest access feature allows the guest access to voicemail for leaving messages and calendar functions for scheduling, canceling, and modifying appointments with subscribers. Further, the guest access feature allows a guest user to access specific data meant for them, e.g., receiving e-mail and fax back, etc.

The mobility module 206 provides for message forwarding and "one number" access across media, and message "morphing" across media for the subscriber. Further, various applications can send notification messages to a variety of destinations, such as e-mails, instant messages, pagers, and the like. In addition, the subscriber can set rules that the mobility module 206 uses to define media handling, such as e-mail, voice and instant messaging handling. Such rules specify data and associated actions. For example, a rule could be defined to say "If I'm traveling, and I get a voicemail or e-mail marked Urgent, then page me."

Further, as will be explained in greater detail below, the collaboration summarization module 114 is used to identify or highlight portions of a multimedia conference and configure the portions sequentially for later playback. The portions may be stored or identified based on recording cues either preset or settable by one or more of the participants in the conference, such as a moderator. As will be explained in greater detail below, the recording cues may be based on vocalized keywords identified by the voice recognition unit of the ComResponse module, or may be invoked by special controls or video or whiteboarding or other identifiers.

Figure 3:
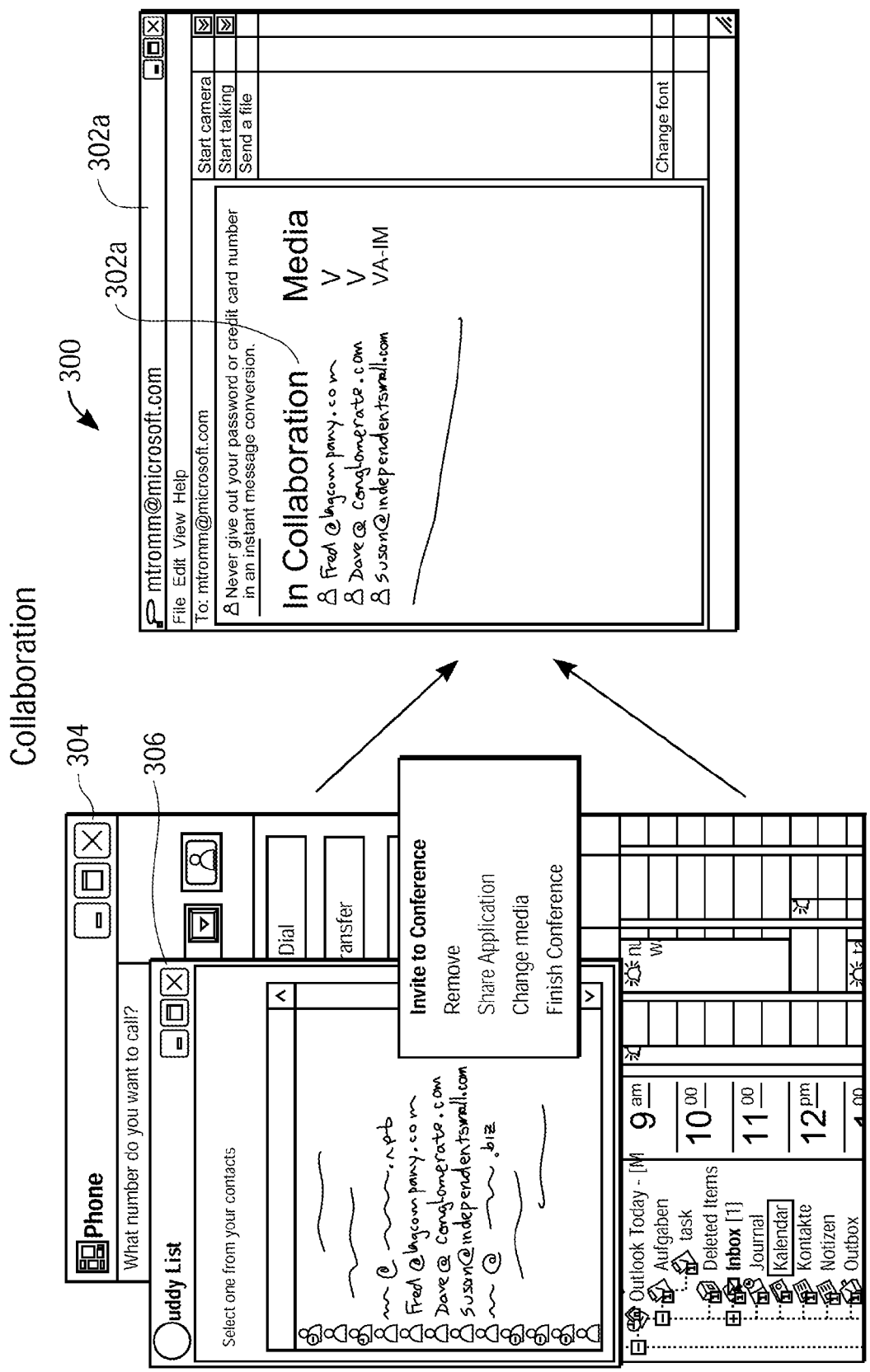
FIG. 3 is a diagram illustrating a graphical user interface according to an embodiment of the present invention.

Turning now to FIG. 3, a diagram of a graphical user interface 300 according to embodiments of the present invention is shown. In particular, shown are a variety of windows for invoking various functions. Such a graphical user interface 300 may be implemented on one or more of the network clients. Thus, the graphical user interface 300 interacts with the Interactive Services unit 128 to control collaboration sessions.

Shown are a collaboration interface 302, a phone interface 304, and a buddy list 306. It is noted that other functional interfaces may be provided. According to particular embodiments, certain of the interfaces may be based on, be similar to, or interwork with, those provided by Microsoft® Windows® Messenger or Outlook®.

The buddy list 306 is used to set up instant messaging calls and/or multimedia conferences. The phone interface 304 is used to make calls, e.g., by typing in a phone number, and also allows invocation of supplementary service functions such as transfer, forward, etc. The collaboration interface 302 allows for viewing the parties to a collaboration 302*a* and the type of media involved. It is noted that, while illustrated in the context of personal computers 122, similar interfaces may be provided the telephones or cellular telephones or PDAs.

Figure 4:
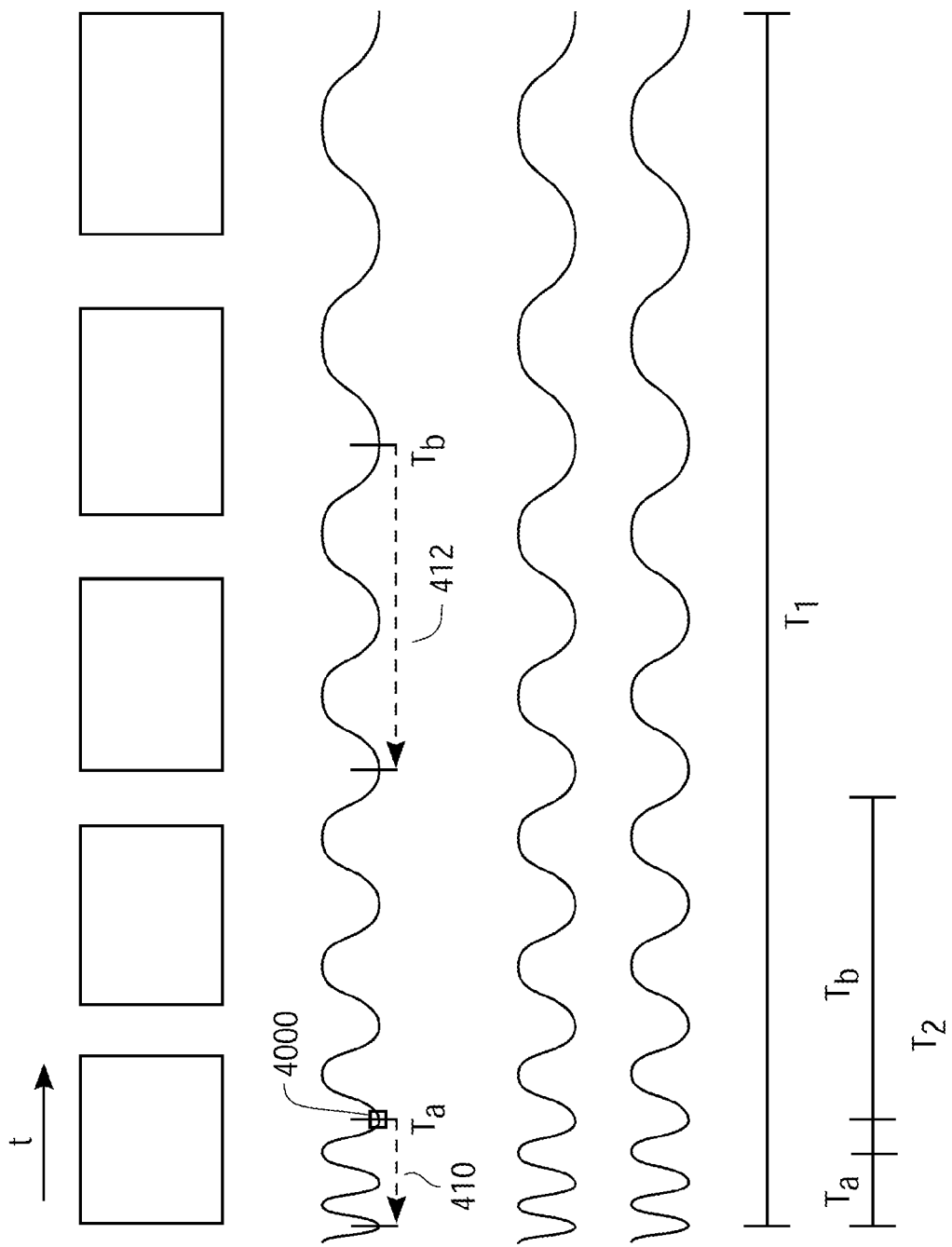
FIG. 4 is a diagram illustrating collaboration summarization according to an embodiment of the present invention.

As noted above, an aspect of the present invention allows selective summarization based on recognition of recording cues. FIG. 4 is a diagram schematically illustrating collaboration summarization according to an embodiment of the present invention. More particularly, shown are a plurality of media streams representative of, for example, a multimedia conference between multiple parties. Shown are a whiteboard stream 400, an audio stream 402, a video stream 404, and an instant messaging stream 406. It is noted that, in practice, more or fewer of such data streams may be present. Thus, the figure is exemplary only.

Also shown in FIG. 4 is a time scale 408 showing a time T1. The time T1 represents, for example, a duration of the conference and hence the period required to review the conference in its entirety once it has been recorded. According to the present invention, however, a participant in the conference, such as a designated moderator, can set and activate or invoke a recording cue, which causes the collaboration summarization system to either mark predetermined periods on the recorded conference or save predetermined periods as a separate summary file. As shown in FIG. 4, at a time Ta, a user activates a recording cue 4000. A period 410 of the conference is then either marked or stored in memory 103 for later playback as part of a collaboration summary. Similarly, at time Tb, another recording cue is activated and a period 412 is then either marked or stored for later playback as part of a collaboration summary. As seen at 416, the result on playback is a summary of the multimedia conference of duration T2.

Figure 5A:
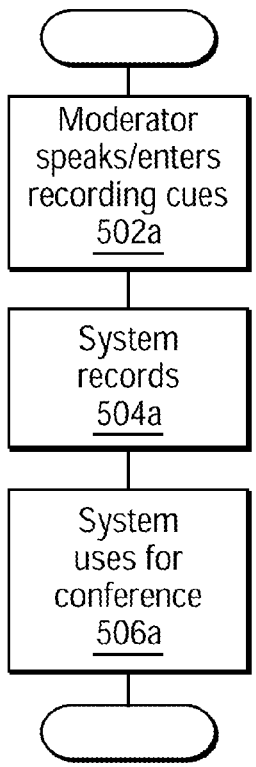
FIG. 5A and FIG. 5B are flowcharts illustrating setting recording cues according to embodiments of the present invention.
Figure 5B:
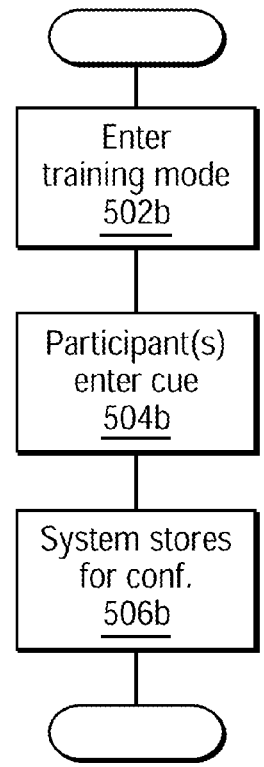
Figure 5C:
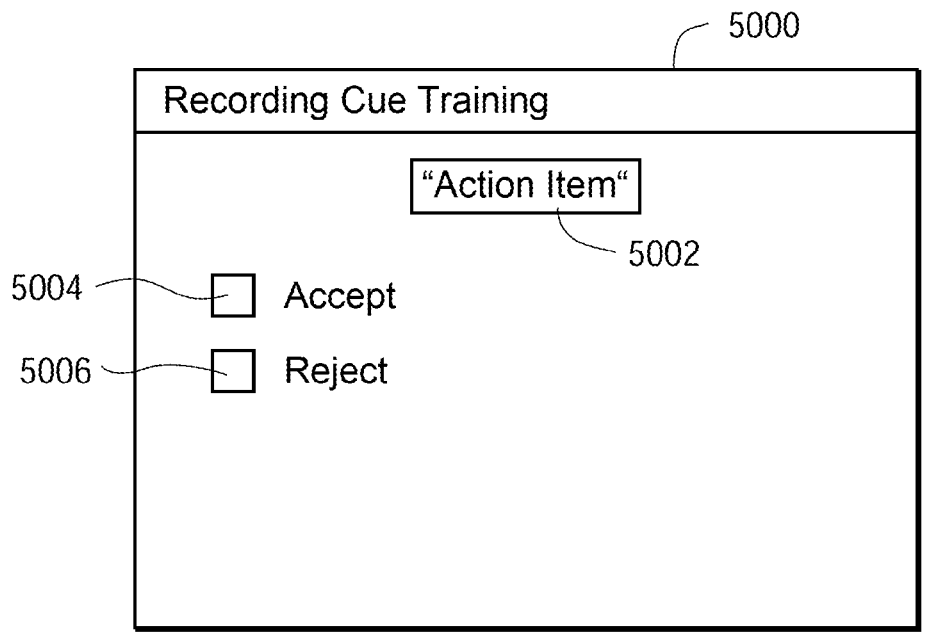
FIG. 5C is a graphical user interface according to an embodiment of the present invention.

FIG. 5A and FIG. 5B are flowcharts illustrating setting recording cues or keywords for conference summarization according to embodiments of the present invention. FIG. 5C illustrates an exemplary user interface window 5000 that may be used to set the recording cue(s). Shown are a cue display area 5002 for displaying the recited cue and accept and reject buttons 5004, 5006. The user interface window 5000 may be generated by or in association with the interaction services module 128 of the client 122 and in communication with the collaboration module 114 of the server 104.

As shown in FIG. 5A, a moderator may set recording cues or keywords for later use in a conference. At 502*a*, the moderator speaks or otherwise enters the desired recording cue. For example, the moderator may set phrases such as "Action Item," "A decision has been reached," "We have a consensus," "Our next meeting will be . . . " and the like. The computer's sound system will receive the cue and display it at 5002 on the graphical user interface of FIG. 5C. In other embodiments, the user can type in a recording cue that will be recognized either from the speech unit of the ComResponse platform or from transcribed text. Alternatively, the user may define a particular entry into whiteboard or instant messaging windows as the recording cue. For example, the moderator may indicate that an R in the whiteboard window means that the contents should be recorded. Alternatively, an X through it should indicate it should not. The user than has an option of accepting or rejecting the cue, by selecting the buttons 5004, 5006 (FIG. 5C). If rejected, the user can re-try. If accepted, the collaboration summarization system 114 will then record the cue at 504*a* (e.g., store it in a database in memory 103) and monitor the conference for instances of the cue at 506*a*, as will be explained in greater detail below. It is noted that an accept/reject option may also be provided for video or other cues, as well.

In addition to, or instead of, the moderator setting the recording cues, in certain embodiments, the recording cues may be set by the individual users prior to beginning the conference. This may be particularly useful if, for example, a voice response system needs to learn the voices of various participants. As shown in FIG. 5B, at step 502*b*, the system may connect the conferees and enter a training mode. In the training mode, while the users may be connected to the server, they are not necessarily connected to one another. At step 504*b*, the users may each set their cues, in a manner similar to that described above with reference to FIG. 5A and FIG. 5C. The training mode may allow, for example, the users to each set various phrases as recording cues and may allow the system to establish a personalized summary of the conference, keyed to the person who made the cue. At step 506*b*, the system stores the cues in memory 103 for use during the conference and then connects the users.

Figure 5D:
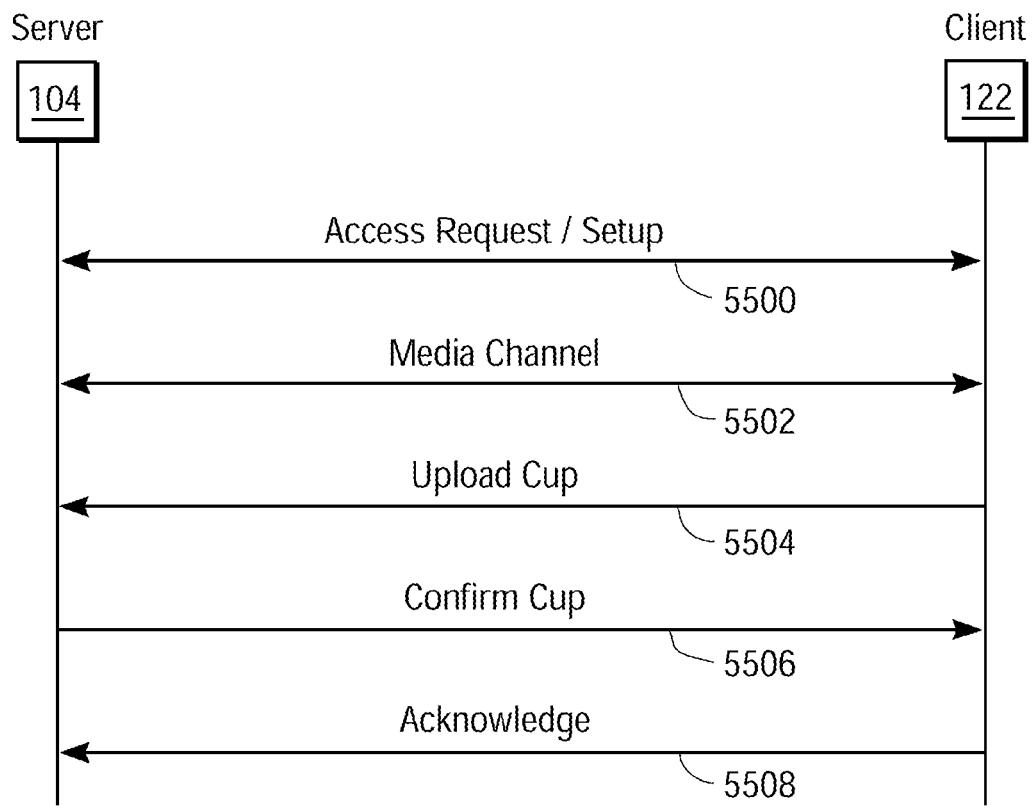
FIG. 5D illustrates signaling for recording cue training according to an embodiment of the present invention.

Signaling for exemplary system recording cue training is shown in FIG. 5D. Shown are a server 104 and a client 122, which may represent the conference moderator or a participant. At 5500, the client 122 requests and receives access to the server 104 for a media session. This can include, for example, a SIP INVITE, RINGING, OK sequence, for example. At 5502, the server 104 and the client 122 open a media channel and the client 122 accesses the collaboration system 114. At 5504, the client 122 uploads the recording cue. As discussed above, this can include a voice or video cue, or whiteboard, etc., markup. At 5506, the collaboration system 114 downloads a confirmation of the recording cue and stores it. For example, it may convert the speech to text and download the text, or may store and analyze the cue and repeat it back, for confirmation. If the cue is appropriately confirmed, then at 5508, the client 122 sends an acknowledge.

Figure 6B:
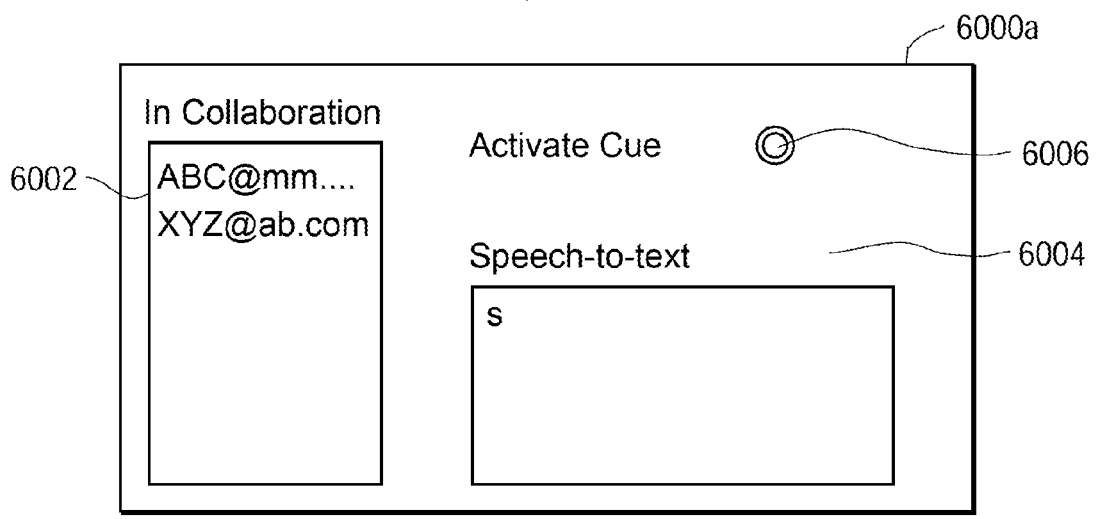
FIG. 6B is a graphical user interface according to an embodiment of the present invention.
Figure 6B:
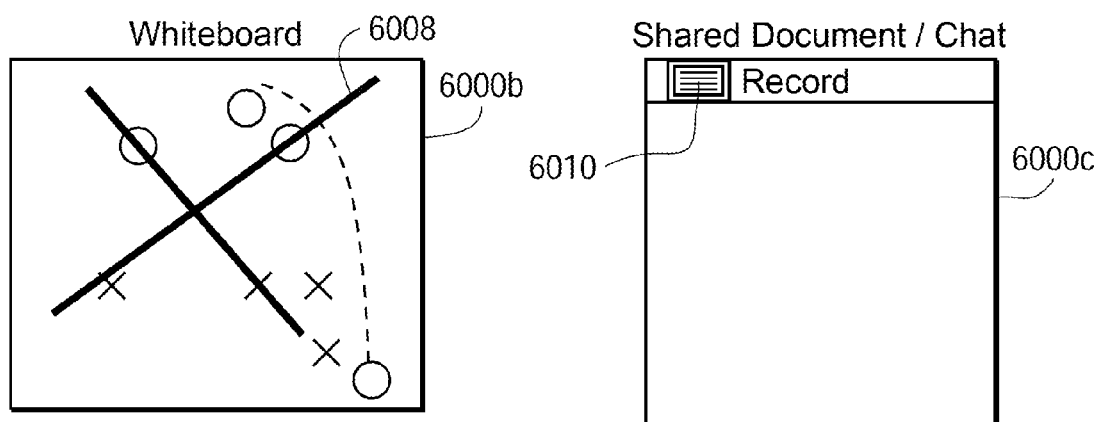

FIG. 6A and FIG. 6B illustrate conferencing and activating recording cues according to an embodiment of the present invention. FIG. 6A is a flowchart illustrating operation of a collaboration according to an embodiment of the present invention. FIG. 6B illustrates an exemplary graphical user interface for use with a collaboration summarization session. In particular, shown are a master window 6000*a*, a whiteboard application window 6000*b*, and a chat/document window 6000*c*. It is noted that in other embodiments, more or fewer of each type of window, as well as windows pertaining to other functions, may also be present. In the embodiment illustrated, the master window 6000*a* includes a In Collaboration field 6002 which defines the participants to the conference; a speech-to-text field 6004 for displaying the converted audio into text; and an Activate Cue button 6006. It is noted that in certain embodiments, in which audio cues are used exclusively, the Activate Cue button 6006 might not be present.

Turning now to FIG. 6A, at 604, the conference begins, with the users all connected via the server, using various media. As noted above, such a conference can include various combinations of media such as voice, video, Instant Messaging, application sharing, whiteboarding, and the like. At 602, the collaboration system records the entirety of the multimedia conference, including all threads and media, by storing it in memory 103. Further, in certain embodiments, the collaboration system activates a speech-to-text unit, e.g., the Com-Response platform, to transcribe all speech from the voice and video channels, which is also stored in association with the conference in memory 103. The window 6004 (FIG. 6B) may be used to display the transcription. At 606, the moderator or one of the users activates one of the recording cues. The recording cue may be activated, for example, by the user or moderator speaking it or by marking the whiteboard or other document being collaborated on. Alternatively, in certain embodiments, the recording cue may be activated by selecting a button or key associated with the client. For example, with reference to FIG. 6B, the user may activate the button 6006; or may draw the X 6008 in the whiteboarding window 6000*b*; or may activate the Record button 6010 of the chat/shared application window 6000*c*. The invoking of the recording cue may occur by the moderator or party formally invoking it, or by the system "picking up" the use of it during the conference.

In response, at 608 (FIG. 6A), the collaboration summarization system 114 either marks the point on the master recording of the conference where the cue was invoked for later playback, or stores in a separate file the associated passage, also for later playback. In either case, the conference portion pertinent to the cue is designated for later playback. In certain embodiments, the summarization is stored or marked or categorized by the party who has invoked the cue. In such an embodiment, a moderator may maintain a master summarization record. In other embodiments, the summarization occurs on a singular basis—i.e., only one summarization is performed, regardless of the invoking party. Finally, at step 610, a match or relevance probability is set in association with the marked or recorded summarization portion of the conference. Any of a variety of probability matching methods may be employed. In this manner, each part of the conference is captured, separated and marked with a probability of its relevance.

Figure 6C:
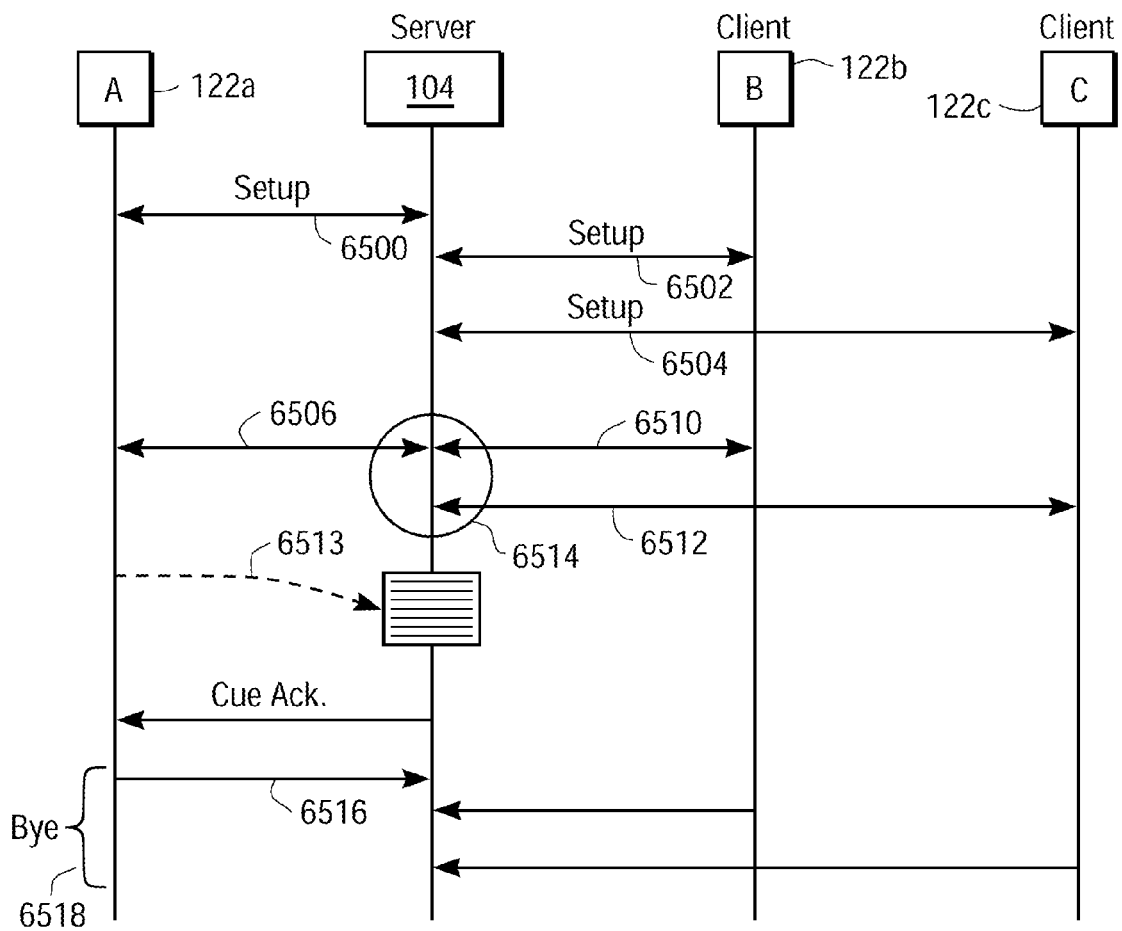
FIG. 6C illustrates signaling for collaboration summarization recording according to an embodiment of the present invention.

FIG. 6C illustrates signaling for a conference summarization session according to an embodiment of the present invention. Shown are a Client A 122*a*, which may also be the moderator; a server, and a Client B 122*b* and a Client C 122*c*. At 6500, the client A or moderator initiates a connection with the server 104, identifies the session as a conference, and identifies the other parties. At 6502 and 6504, the other parties to the conference, Client B and Client C, likewise log in to the server 104. As in the recording cue case, the log in process can be in accordance with the SIP protocol. Next, at 6506, 6508, and 6510, the clients 122*a*-122*c* establish media connections via the server 104. At 6512, the server 104 records the conference and the collaboration summarization system 114 monitors the ongoing media for the recording cue(s). If a recording cue is detected, then at 6514, the collaboration summarization system 114 records or marks the relevant passage or clip or portion of the conference as part of the summary as it is stored in memory. In addition, the collaboration summarization system 114 may return a cue acknowledge signal to the moderator to indicate that the cue was received or detected. The conference can be terminated at 6518 in a known manner.

Figure 7B:
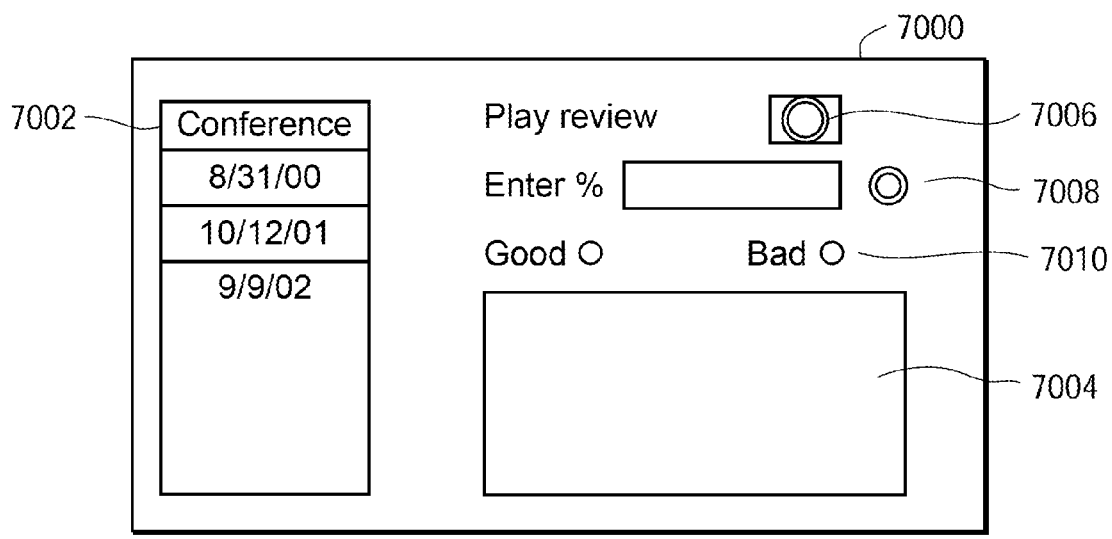
FIG. 7B is a graphical user interface according to an embodiment of the present invention.

FIG. 7A and FIG. 7B illustrate playing a summarization according to an embodiment of the present invention. FIG. 7A is a flowchart illustrating operation of a playback embodiment of the present invention. FIG. 7B is an exemplary user interface 7000 for the playback.

As shown in FIG. 7B, the interface includes a conference list 7002 listing conferences that have been saved and summarized; one or more viewing windows 7004; a play button 7006; a relevance probability entry field 7008; and training buttons 7010.

Turning now to FIG. 7A, at step 702, the user desiring a summary will activate a summary function using his GUI 7000, for example, by selecting the conference from the conference window 7002 and selecting the play button 7006. In certain embodiments, a default match percentage will be used to deliver the summary. In other embodiments, the user can designate a selectable probability or percentage match threshold using the match field 7008—for matches to the cue higher than the threshold, the system will play back a summary. As noted above, in certain embodiments, this can be embodied as playing back a single file containing all media above the threshold, or can be embodied as accessing a single broad summary file with relevant passages at the desired percent match marked. At 704, the system will access the stored conference and play back the summary according to the percent match.

Figure 7C:
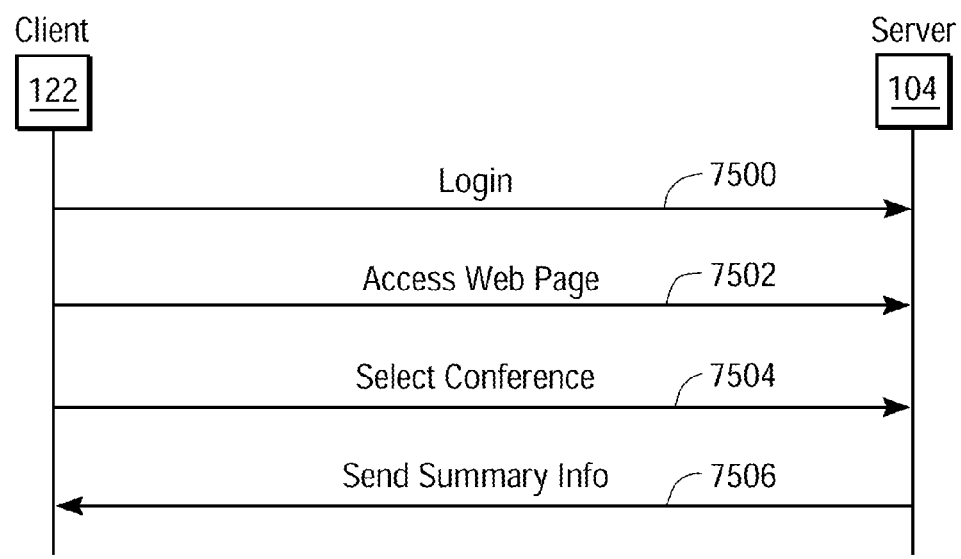
FIG. 7C illustrates signaling for summarization access according to an embodiment of the present invention.

FIG. 7C illustrates signaling for summary access according to an embodiment of the present invention. Shown are a client 122 and server 104. At 7500, the client 122 logs in to the server 104. At 7502, the client accesses, for example, a web page interface, such as described above. At 7504, the user can select the summary for viewing. As noted above, this can include specifying percent matches, and the like. Finally, at 7506, the server 104 sends back the appropriate summary from memory 103. It is noted that, in other embodiments, the entirety of the summary can be downloaded, and thereafter accessed locally.

Figure 8:
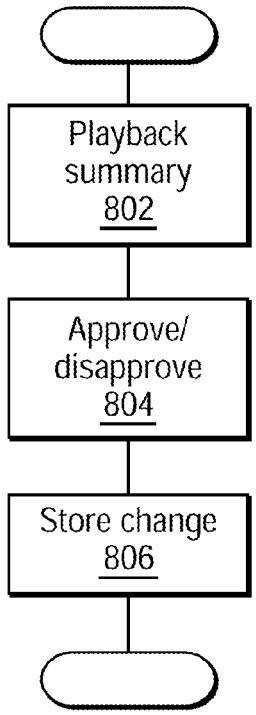
FIG. 8 is a flowchart illustrating operation of an embodiment of the present invention.

As noted above, the system can be trained to recognize cues prior to the start of a conference. FIG. 8 illustrates another way of training the system. More particularly, a user can activate approval indicia, such as "thumbs up" or "thumbs down" (or good-bad) buttons when playing back his selected summary. That is, each time the user detects an inaccuracy on behalf of the system, he can select the "thumbs down" button and each time he is satisfied, he can push the "thumbs up" button. This is interpreted by the system and can be used when the same scenario occurs in the future. Such good-bad buttons 7010 are illustrated in FIG. 7B.

Operation of this training method is illustrated more particularly with reference to FIG. 8. In particular, at 802, the user elects to playback the selected summary. At 804, the user presses the "thumbs up" or "thumbs down" buttons to indicate approval or disapproval. At 806, the system stores the approval-disapproval after identifying the context. The knowledge can then be used on subsequent occasions when the context occurs again. That is, the collaboration system 114 can learn whether a cue was correctly detected as having been invoked. Thus, the next time a cue is determined to be invoked, the system can check both its database of "user-set" cues and cross-reference its record of "learned" probabilities. Further, such training can be used by the collaboration summarization system 114 to search through and update other stored summarizations, if desired.

Figure 9A:
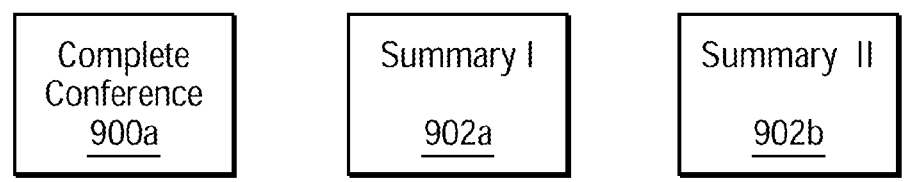
FIG. 9A and FIG. 9B represent schematically the storage of the recorded conference and summarization(s).

As noted above, the summarization can be stored by the system either as a completely separate file or as indices marking "points" on the complete conference recording. This is illustrated more particularly with reference to FIGS. 9A and 9B. Shown in FIG. 9A is a file 900a representing the complete recorded conference. Also shown are files 902a, 902b representing one or more recorded summaries of the conference. In certain embodiments, each file represents a complete summary based on a particular user's automatic or deliberate invocation of recording cues. In certain embodiments, only one such file will be created (i.e., based on the moderator's cueing). Alternatively, each file can represent a complete summary based on a percent match with the recording cue.

Figure 9B:
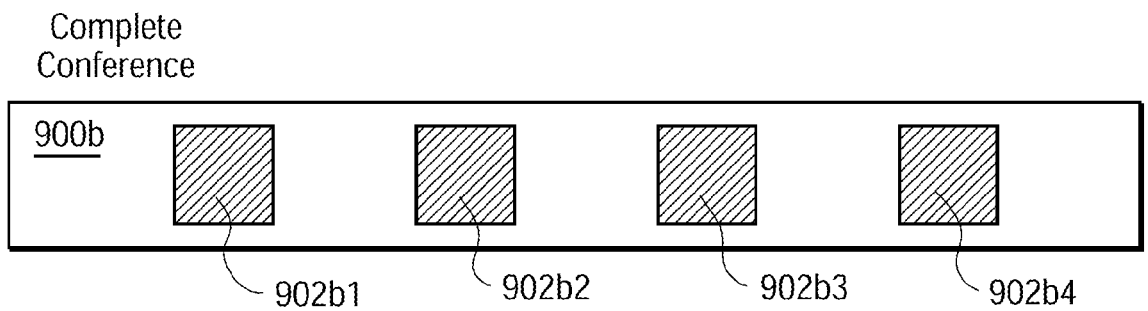

FIG. 9B illustrates indexing against the recorded conference. More particularly, 902b represents the recorded complete conference. Shown at 902b1, 902b2, 902b3, 902b4, are indices representing invocation of recording cues, marked, for example, by a time stamp on the recorded conference 900b. Again, the recording cues can be invoked by the moderator or parties to the conference. The indices can be unique to the party invoking the cue. Alternatively, only the moderator can be allowed to invoke cues other than automatic ones.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications method, comprising:
    storing a plurality of particular user-defined recording cues prior to a multimedia conference, said particular user-defined recording cues adapted for marking a predetermined time period around which at least a portion of a multimedia conference is recorded, said storing including training a conferencing system to recognize said cues;
    capturing sequentially portions of said multimedia conference by said conferencing system responsive to execution in conference content of said plurality of recording cues, and assigning a probability of recognition to each captured portion when capturing occurs;
    wherein said execution of said plurality of recording cues includes participant invocation of a particular user-defined recording cue while a conference is ongoing and automatic recognition of said recording cue in said conference content, and wherein at least one participant invocation being in a Session Initiation Protocol (SIP) message from a SIP device; and
    playing back a conference summary that includes only captured portions having an assigned probability of recognition that is above a selected threshold probability, wherein any captured portions that have an assigned probability at or below said selected threshold are excluded from said conference summary.

2. The telecommunications method in accordance with claim 1, wherein said recording cues comprise one or more audio cues for recognition in audio content.

3. The telecommunications method in accordance with claim 1, wherein said recording cues comprise one or more visual cues for recognition in video content.

4. The telecommunications method in accordance with claim 1, further comprising
    transcribing an audio portion of said multimedia conference; and
    wherein said capturing comprises capturing associated transcribed audio portions and storing captured said portions as a separate conference summary.

5. A telecommunications system, comprising:
    a local area network (LAN);
    a multimedia server, wherein said multimedia server is a computer operable coupled to said network, said multimedia server adapted to manage a multimedia conference and including a memory for storing selectable portions of said multimedia conference; and
    one or more client devices operable coupled to said LAN and adapted to set particular user-defined recording cues for choosing said portions of said multimedia conference for store and playback, wherein said multimedia server comprises a Session Initiation Protocol (SIP) server and at least one of said one or more clients is a SIP client, said one or more client devices are adapted to set probabilities of recognition of said recording cues, and
    wherein setting particular user-defined recording cues includes training the multimedia server to recognize said recording cues prior to a multimedia conference and automatically recognize participant invocation of a recording cue in conference content while a conference is ongoing and playing back a conference summary is responsive to a selectable threshold probability, the conference summary includes only stored portions having an assigned probability of recognition that is above the selected threshold probability, wherein any stored portions that have an assigned probability at or below said selected threshold are excluded from said conference summary.

6. The telecommunications system in accordance with claim 5, said one or more clients adapted to select for storing a transcription of an audio portion of said multimedia conference.

7. The telecommunications system in accordance with claim 5, wherein said one or more client devices are adapted to set probabilities of recognition of said recording cues, stored said portions comprise a separate conference summary of said multimedia conference, and on-participants in said conference are selectively provided access to said separate conference summary.

8. The telecommunications system in accordance with claim 5, wherein said recording cues comprise audio recording cues for recognition in audio content.

9. The telecommunications system in accordance with claim 5, wherein said recording cues comprise video recording cues for recognition in video content.

10. A telecommunications server, wherein said server is a computer comprising:
    a multimedia communication controller for interfacing multimedia conferences;

a Session Initiation Protocol (SIP) server, wherein said SIP server is a computer having at least one SIP client; and a collaboration controller operable coupled to said multimedia communication controller and said SIP server, said collaboration controller adapted to store a multimedia conference and assign a probability of recognition to portions of said conference being stored, said collaboration controller is adapted to play back selected portions of said multimedia conference according to user selected criteria based on particular user-defined recording cues, said user selected criteria including selecting a threshold probability, wherein said particular user-defined recording cues are user-selectably trained for recognition in conference content prior to the multimedia conference and are invocable by a user while a conference is ongoing and automatically recognized in said conference content by the collaboration controller upon invocation, and wherein collaboration controller selects for play back only stored portions having an assigned probability of recognition that is above said selected threshold probability, any stored portions that have an assigned probability at or below said selected threshold are excluded from said conference summary.

11. The telecommunications server in accordance with claim 10, said collaboration controller adapted to select for storing a transcription of an audio portion of said multimedia conference responsive to the occurrence of said cues in said conference content and provide stored transcriptions as a conference summary.

12. The telecommunications server in accordance with claim 10, wherein said recording cues comprise audio recording cues for recognition in audio content.

13. The telecommunications server in accordance with claim 10, wherein said recording cues comprise video recording cues for recognition in video content.

14. The telecommunications server in accordance with claim 13, wherein said recording cues comprise whiteboard recording cues for recognition in white board content.

15. A telecommunications device, comprising:

an interaction center computer adapted to conduct a multimedia conference including instant messaging and adapted to allow defining particular user-defined recording cues for subsequently playing back portions of said multimedia conference, wherein said defining particular user-defined recording cues includes a plurality of participants to the conference defining and training the interaction center computer to recognize in conference content particular user-defined recording cues prior to the multimedia conference and recognizing an invoking of a particular user-defined recording cue in said conference content while the conference is ongoing, wherein telecommunications device is a Session Initiation Protocol (SIP) device and said recording cues further comprise instant messaging recording cues for recognition in instant messaging content, said interaction center further adapted to specify a playback content that includes only conference portions having a cue match probability that is above a selected threshold probability, wherein any conference portions that have said cue match probability at or below said selected threshold are excluded from said playback content.

16. The telecommunications device in accordance with claim 15 wherein said recording cues comprise audio recording cues for recognition in audio content.

17. The telecommunications device in accordance with claim 16, wherein said recording cues further comprise video recording cues for recognition in video content.

* * * * *